United States Patent
Brosnan et al.

(10) Patent No.: US 12,553,876 B2
(45) Date of Patent: Feb. 17, 2026

(54) ODOR-BASED PRODUCE IDENTIFICATION SYSTEM

(71) Applicant: Toshiba Global Commerce Solutions Holdings Corporation, Tokyo (JP)

(72) Inventors: Susan W. Brosnan, Raleigh, NC (US); Jessica Snead, Cary, NC (US); Patricia Hogan, Raleigh, NC (US); Daniel Robert Goins, Wake Forest, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 973 days.

(21) Appl. No.: 17/700,867

(22) Filed: Mar. 22, 2022

(65) Prior Publication Data

US 2023/0304985 A1    Sep. 28, 2023

(51) Int. Cl.
| | | |
|---|---|---|
| G01N 33/02 | (2006.01) | |
| G01N 33/00 | (2006.01) | |
| G07G 1/00 | (2006.01) | |
| G07G 1/01 | (2006.01) | |

(52) U.S. Cl.
CPC ......... *G01N 33/02* (2013.01); *G01N 33/0001* (2013.01); *G01N 33/0031* (2013.01); *G07G 1/0036* (2013.01); *G07G 1/01* (2013.01)

(58) Field of Classification Search
USPC ...................................................... 73/23.34
See application file for complete search history.

(56) References Cited

U.S. PATENT DOCUMENTS

| | | | | |
|---|---|---|---|---|
| 3,725,895 | A | * | 4/1973 | Haynes ................. G07G 3/003 116/214 |
| 4,770,027 | A | * | 9/1988 | Ehara ..................... G01N 33/02 73/31.06 |
| 5,675,070 | A | * | 10/1997 | Gelperin ............ G01N 33/0031 73/23.34 |

(Continued)

FOREIGN PATENT DOCUMENTS

| | | | | | |
|---|---|---|---|---|---|
| GB | 2348010 | A | * | 9/2000 | .......... G01N 29/022 |
| JP | 2017146854 | A | * | 8/2021 | |
| WO | WO-2016031585 | A | * | 3/2016 | ............... G01N 1/22 |

OTHER PUBLICATIONS

Wilson, A.D et al., "Applications and Advances in Electronic-Nose Technologies", Sensors, 2009, pp. 5099-5148.*

(Continued)

*Primary Examiner* — Daniel S Larkin
(74) *Attorney, Agent, or Firm* — COATS & BENNETT, PLLC

(57) ABSTRACT

A system and method for identifying different types of produce at checkout based on an odor emitted by the produce is provided herein. An olfactometer is used to detect chemical compounds contributing to an odor of the produce at checkout. Based on the detected odor, an odor profile is constructed and compared to one or more baseline odor profiles stored in memory. Based on the comparison results, a freshness date for the produce is determined provided to a device associated with the shopper. So informed, the shopper is aware of how long the produce will be considered fresh. Additionally, one or more reminder messages may be sent to a device associated with the shopper reminding them of the freshness date for the produce they purchased.

19 Claims, 8 Drawing Sheets

(56) References Cited

U.S. PATENT DOCUMENTS

| | | | | |
|---|---|---|---|---|
| 5,918,257 | A * | 6/1999 | Mifsud | G01N 33/0031 73/31.06 |
| 6,411,905 | B1 * | 6/2002 | Guoliang | G01N 33/0001 73/31.06 |
| 7,454,365 | B1 * | 11/2008 | Brosnan | G06Q 20/20 340/568.1 |
| 8,498,903 | B2 * | 7/2013 | Edwards | G07G 1/0054 705/16 |
| 8,701,463 | B2 * | 4/2014 | Brasfield | G01N 33/0001 73/23.34 |
| 9,412,050 | B2 * | 8/2016 | He | G06F 18/253 |
| 11,017,422 | B2 * | 5/2021 | Smith | G06Q 30/0224 |
| 11,245,764 | B2 * | 2/2022 | Watanabe | G01N 33/0031 |
| 11,263,498 | B2 * | 3/2022 | Kim | G06T 7/70 |
| 11,360,069 | B2 * | 6/2022 | Yamasaki | G01N 27/12 |
| 11,366,067 | B2 * | 6/2022 | Hsu | G01N 33/0036 |
| 11,598,740 | B2 * | 3/2023 | Watanabe | G06F 13/00 |
| 2008/0150556 | A1 | 6/2008 | Han et al. | |
| 2015/0308996 | A1 * | 10/2015 | Kim | G01N 33/0001 73/23.34 |
| 2018/0209950 | A1 * | 7/2018 | Iwanaga | C09B 23/148 |
| 2019/0056370 | A1 * | 2/2019 | Yamasaki | G01N 29/022 |
| 2020/0309757 | A1 * | 10/2020 | Ramos | G06F 1/163 |
| 2021/0018479 | A1 * | 1/2021 | Watanabe | G01N 27/02 |
| 2022/0291182 | A1 * | 9/2022 | Mcdaniel | G01N 21/6428 |

OTHER PUBLICATIONS

"CHROMATOGRAM", Apr. 13, 2014, p. 1, retrieved on Mar. 25, 2022, retrieved from internet: https://www.google.com/search?q=chromatogram&rlz=1C1GCEB_enUS864US864&tbm=isch&source=iu&ictx=1&vet=1&fir=_w-OKh-wOXZW4M%252C7IPNXyoTRc1PAM%252C_%253BETvQsk5oml0WbM%252C7IPNXyoTRc1PAM%252C_%253BrvwQvqmeCyod9M%252CKdOGnu_L3xeekM%252C_%253BH6xqetrWE7O9sM%252Cd6zkvX2IT-mgcM%252C_%253Bi8aRBcfd1NolxM%252CKdOGnu_L3xeekM%252C_%253BgmBiN2d0thlwMM%252C63dDmhujRcX3iM.

Electronic Sensor Technology, Inc., "Portable zNose", pp. 1-4, Jan. 1, 2022, retrieved on Mar. 24, 2022, retrieved from internet: https://estcal.com/product/portable-znose/.

Electronic Sensor Technology, Inc., "Electronic Sensor Technology, Inc.", pp. 1-6, Jan. 1, 2022, retrieved on Mar. 24, 2022, retrieved from internet: https://estcal.com.

Mozes, A. et al., "The ultimate 'smell test': Device sends rotten food warning to smartphones", Jun. 27, 2018, pp. 1-3, retrieved on Mar. 24, 2022, retrieved from internet: https://phys.org/news/2018-06-ultimate-device-rotten-food-smartphones.html.

Scudellari, M., "Meet the E-Nose That Actually Sniffs", Oct. 26, 2018, pp. 1-4, retrieved on Feb. 18, 2022, retrieved from internet: https://spectrum.IEEE.org/meet-the-enose-that-actually-sniffs.

Anisimov, D. et al., "Fully integrated ultra-sensitive electronic nose based on organic field-effect transistors", Scientific Reports, vol. 11, No. 10683, May 21, 2021, pp. 1-12, Springer Nature.

Aprea, E. et al., "Sweet taste in apple: the role of sorbitol, individual sugars, organic acids and volatile compounds", Scientific Reports, vol. 7 No. 44950, Mar. 21, 2017, pp. 1-10, Springer Nature.

ScienceDirect, "Chromatogram—An Overview", pp. 1-18, retrieved on Feb. 18, 2022, retrieved from internet: https://www.sciencedirect.com/topics/engineering/chromatogram.

Deepak, "How to Read a Chromatogram?", Dec. 27, 2013, pp. 1-24, retrieved on Feb. 18, 2022, retrieved from internet: https://lab-training.com/how-to-read-a-chromatogram/.

Baietto, M. et al., "Electronic-Nose Application for Fruit Identification, Ripeness and Quality Grading", Sensors, vol. 15, Jan. 6, 2015, pp. 899-931, MDPI.

* cited by examiner

ID-BASED PRODUCE IDENTIFICATION SYSTEM

BACKGROUND

Many retail stores offer various types of produce for sale to their customers. A sticker having a printed Universal Product Code (UPC) and/or a Price Lookup (PLU) code is usually applied to each individual produce item. When checking out at a self-checkout (SCO) station, or at a traditional staffed checkout station, a shopper or cashier will optically scan the UPC or manually enter the PLU code to identify the produce item and add it to the shopper's checkout order.

DETAILED DESCRIPTION

Retailers typically place stickers having a UPC and/or a PLU code on the produce they offer for sale. However, during or before the self-checkout process, the stickers often fall off the produce items. Additionally, while they may know the particular type of produce item they have for purchase, a shopper or cashier may not know the particular UPC or PLU code for the produce item. In these cases, the shopper or cashier must waste time performing a manual lookup procedure to determine the UPC or PLU code for the produce item. Some retail stores utilize video analytics to identify the produce items. However, these systems are not accurate enough to detect the differences between various types of produce. By way of example only, a video analytics system may be able to distinguish between an apple and a banana, but they are not able to detect whether an apple is a Braeburn apple or a Gala apple.

Aspects of the present disclosure provide a system and method for identifying different types of produce items at checkout based on an odor emitted by the produce item. More particularly, the present aspects utilize a digital olfactometer or electric nose to "sniff" the produce item during a checkout process. Based on a detected odor of the produce item, an "odor profile" for the produce item is constructed and compared to one or more baseline odor profiles stored in memory. Based on the results of that comparison, a "freshness date" for the produce item is determined and sent for display to the shopper. In the context of the present aspects, a "freshness date" is the last date that the produce item is considered to be fresh. Thereafter, in some aspects, one or more reminder messages may be sent to the shopper reminding them of the freshness date for the produce item. This helps prevent shoppers from forgetting about the produce after purchase, and beneficially promotes the use of the produce by the shopper while the produce is still fresh.

Figure 1:
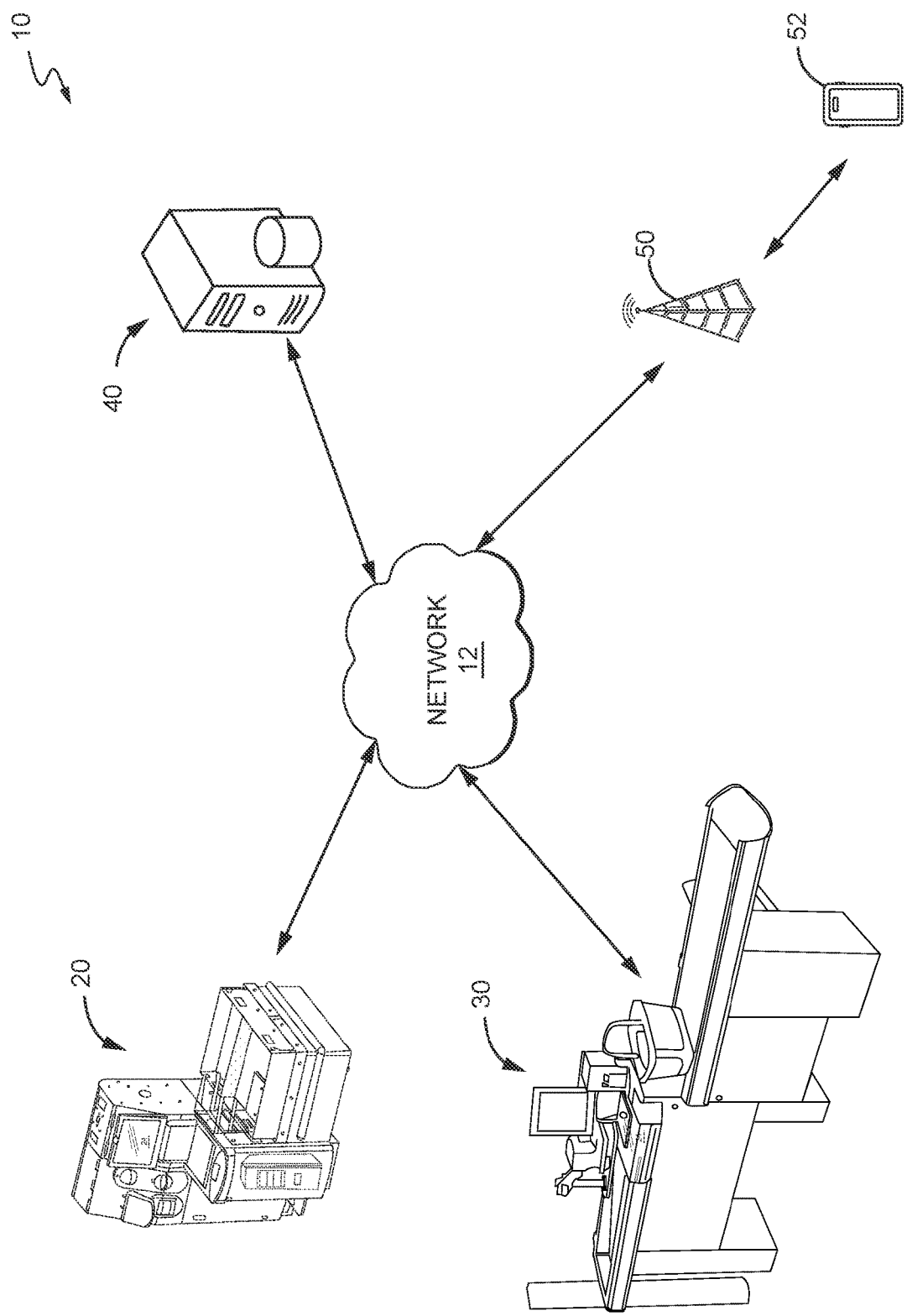
FIG. 1 illustrates a communication network configured according to one aspect of the present disclosure.

Turning to the drawings, FIG. 1 illustrates some of components included in a system 10 configured according to one aspect of the present disclosure. Those of ordinary skill in the art should readily appreciate that the components seen in FIG. 1 are illustrative only, and that system 10 may comprise components in addition to, or in lieu of, those seen in FIG. 1.

As seen in FIG. 1, system 10 includes a communication network 12 that comprises one or more private and/or public packet data networks, such as the Internet, for example. According to the present disclosure, network 12 communicatively interconnects one or more Point-of-Sale (POS) terminals, such as self-checkout (SCO) station 20 and assisted checkout (ACO) station 30, to one or more application servers (ASs) 40. Additionally, in some embodiments, network 12 communicatively connects to a radio communications network. In such embodiments, the radio communications network comprises one or more base stations 50 configured to provide voice and/or data services, as is known in the art, to one or more user devices, such as a shopper's personal mobile device 52.

As described in more detail later, the SCO 20 and ACO 30 comprise one or more digital olfactometers commonly referred to as "electronic noses" or "e-noses." As a shopper scans produce for purchase, the digital olfactometers electronically detect the chemical compounds that contribute to an odor being emitted by the produce. An "odor profile" is then generated for the produce and used to determine, inter alia, how fresh the produce is. The odor profile and/or the freshness determination may be implemented by the SCO 20, the ACO 30, the AS 40, or any combination thereof. So determined, the freshness information is provided to the shopper. In one embodiment, for example, the freshness information is a "use-by" or "best-by" date and is output to a display of SCO 20 or ACO 30. In another embodiment, the freshness information is sent to the shopper's personal mobile device 52 via the radio communications network and base station 50.

In yet other embodiments, system 10 can send reminders to the shopper's mobile device 52 reminding them of the freshness information. By way of example only, AS 40 may generate a text message to be sent to the shopper's mobile device 52 indicating that the previously purchased produce should be prepared and/or consumed within the next two days. Such texts may be generated and sent well after the shopper has purchased the produce and left the store. Alternatively, the texts may identify alternatives to preparing or consuming the produce, such as instructions and details on freezing the produce. In these latter embodiments, the text messages may provide a Uniform Resource Locator (URL) that links to a resource having the information.

The present embodiments provide benefits to the manufacturers of POS terminals, retailers that use those POS terminals, and shoppers that conventional POS terminals and systems do not or cannot provide. For example, some conventional systems and methods place physical Radio Frequency Identification Devices (RFIDs) on the produce they sell. The RFID devices contain information that will allow a retail employee or vendor of the produce to determine whether or not the produce is no longer fresh. In other conventional systems, the retail employee or vendor of the produce may use an olfactometer to determine whether a given produce is no longer fresh.

However, with conventional systems, none of the information as to whether the produce is fresh is provided to a shopper purchasing the produce. Rather, it is provided to the retailer or vendor of the produce to help them determine whether to replace existing produce on the shelves with fresh produce. Moreover, conventional systems do not determine how long produce that is currently considered to be fresh will remain as such based on an odor emitted by the produce. Rather, the information provided by olfactometers are used by retailers and vendors in a binary "pass/fail" manner. That is, the retailers or vendors are only able to determine whether their produce is "fresh" or "not fresh." Further, the RFID devices placed on produce by some retailers are not recoverable or reusable. Therefore, such approaches are expensive, and the related costs are typically passed onto the shoppers.

A system configured according to the present embodiments, however, negates or greatly reduces these issues. For example, the SCOs 20 and ACOs 30 configured according to the present embodiments include digital olfactometers. These devices are advantageously positioned on the SCOs 20 and ACOs 30 to sense the odor being emitted by produce that is actually being purchased by the shopper. Further, the information gleaned from these devices is provided directly to the shopper and includes data indicating how much longer the produce will be considered fresh. Armed with this information, shoppers are better able to utilize the produce they purchase instead of simply throwing forgotten, expired produce away. Therefore, shoppers save money and produce waste is minimized. Moreover, the manufacturers of the SCOs 20 and ACOs 30 provide a better product to their retail customers, which in turn, serves to attract a wider shopper base.

Additionally, a system configured to implement the present embodiments negates the need for both the shopper and the cashier to manually enter Price Lookup (PLU) codes. Particularly, embodiments of the present disclosure, as described below, can also identify produce based on an odor it emits. Therefore, implementing the present embodiments eliminates the time and resources needed for searching a database based on a visual description of the produce item. Not only does this save time and resources, but it also provides brick-and-mortar establishments with an advantage over on-line vendors. Particularly, shoppers are more likely to personally engage and interact with the employees of the retail store. Such personal engagement can be especially beneficial when shoppers feel that a store employee can quickly and efficiently assist them.

Figure 2:
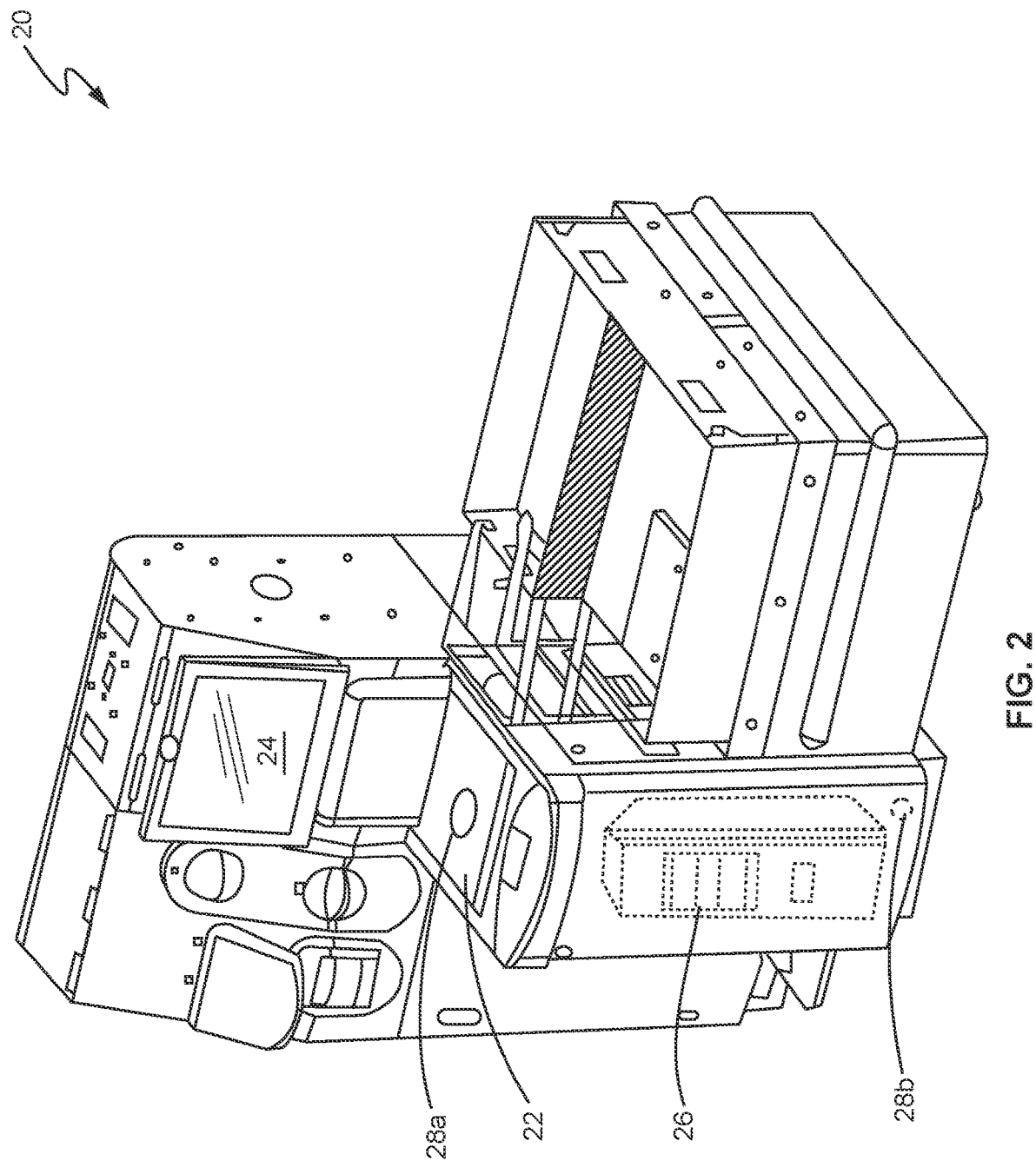
FIG. 2 is a perspective view illustrating a self-checkout station (SCO) configured according to one aspect of the present disclosure.

FIG. 2 is a perspective view illustrating an SCO station 20 configured according to one aspect of the present disclosure. As seen FIG. 2, SCO station 20 comprises a scanner scale 22 onto which a shopper places produce items for scanning and weighing. Information related to the produce being purchased then appears on a display 24 and, in at least one embodiment, is provided by a computing device 26 that controls the operation of SCO 20. As is known in the art, SCO station 20 may also include other functional components, such as a product receiving area where products are placed after scanning, and a payment section, where the shopper pays for the purchased products.

In addition, however, SCO station 20 is configured, as stated above, to include one or more digital olfactometers. How digital olfactometers operate is well-known in the art, and therefore, not explained in detail here. However, for completeness' sake, digital olfactometers typically comprise an array of chemical sensors (e.g., based on metal oxides or conducting polymers) configured to detect the chemical compounds that contribute to an odor being emitted by produce. Air pumps deliver samples of the odor being emitted by the produce to the sensors, which then electrically react to the chemical compounds in the samples. Each chemical compound causes a unique reaction, which is compared to a database of known reactions for the produce. Based on the comparison, the olfactometer can determine whether the produce is fresh.

In the embodiment of FIG. 2, SCO station 20 comprises two digital olfactometers 28a and 28b (collectively herein, olfactometer 28). In this embodiment, olfactometer 28a is integrated with scanner scale 22 and is configured to electronically sense the odor of produce being placed on scanner scale 22. The other olfactometer 28b is advantageously positioned at the bottom of SCO station 20 proximate a ground surface. Some produce may be too heavy for a shopper to lift from the cart and onto the scanner scale 22, or it may be too large to fit inside the shopper's cart. Regardless, in this position, olfactometer 28b can electronically sense the odor being emitted by produce that is placed on the bottom shelf of a shopping cart without requiring the shopper to lift the produce onto the scanner/scale 22.

Figure 3:
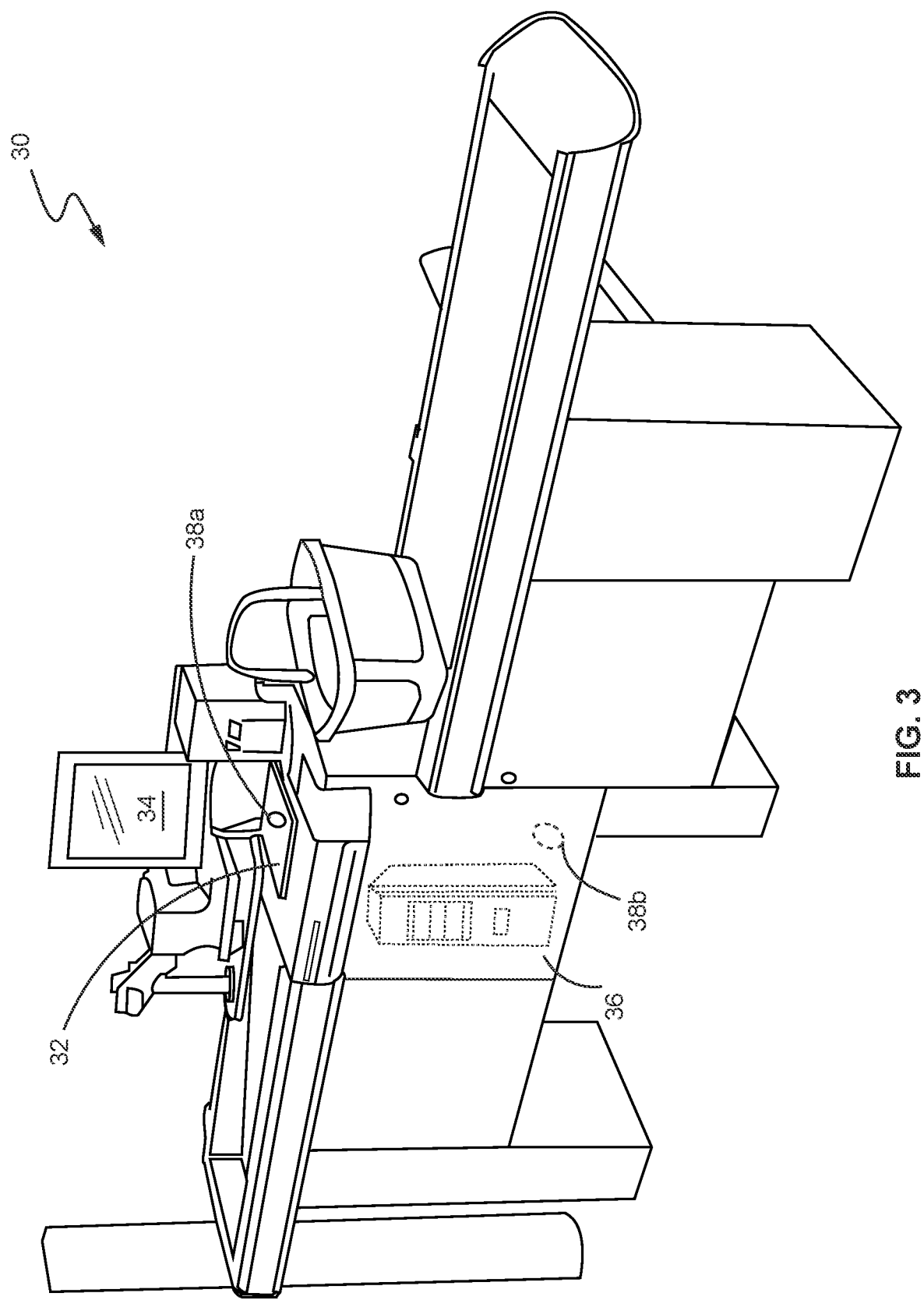
FIG. 3 is a perspective view illustrating a checkout station configured according to one aspect of the present disclosure.

FIG. 3 is a perspective view of an ACO station 30 configured according to one aspect of the present disclosure. As is known in the art, ACO station 30 is a traditional employee-assisted checkout station in which a store employee scans the products being purchased by the shopper and accepts payment for the products. Similar to SCO station 20 of FIG. 2, ACO station 30 comprises a scanner scale 32, a display 34, and a computing device 36 configured to control the operation of ACO station 30. According to the present embodiments, however, ACO station 30 also comprises a plurality of digital olfactometers 38a, 38b (collectively herein, olfactometer 38). For reasons similar to those stated with respect to the embodiment of FIG. 2, one of the olfactometers 38a is integrated with the scanner scale 32, while the other olfactometer 38b is disposed on ACO station 30 proximate the ground surface.

Figure 4:
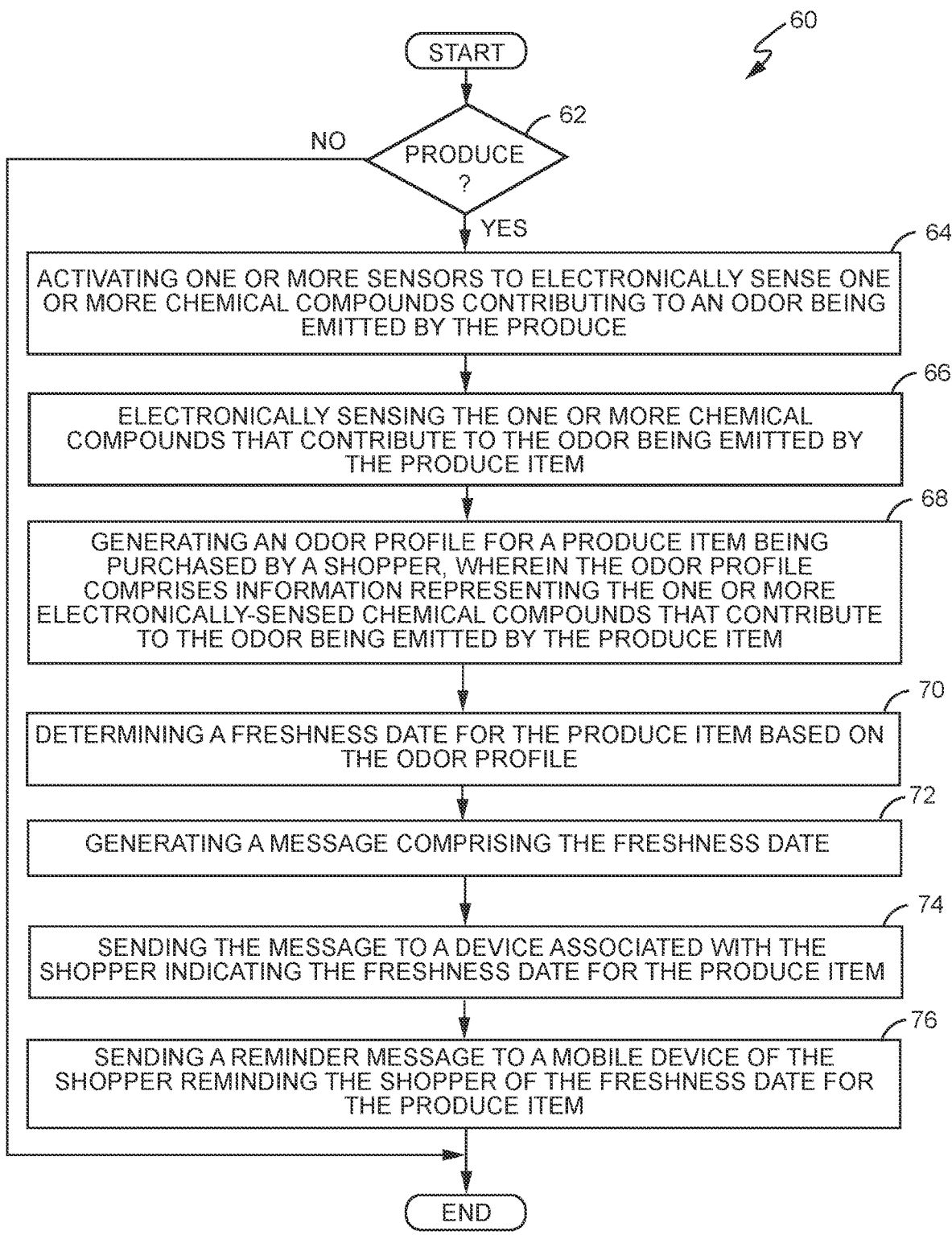
FIG. 4 is a flow diagram illustrating a method for checking out produce from a store according to one aspect of the present disclosure.

FIG. 4 is a flow diagram illustrating a method 60 for checking out produce from a store according to one aspect of the present disclosure. As described herein, method 60 is implemented by computing device 26 of SCO station 20. However, those of ordinary skill in the art should readily appreciate that this is merely for illustrative purposes. In another embodiment, method 60 is implemented by computing device 36 of ACO station 30. In another embodiment, method 60 is implemented by AS 40. In still other embodiments, method 60 is implemented by a combination of SCO station 20/ACO station 30 and AS 40.

As seen in FIG. 4, method 60 first determines whether a shopper is purchasing produce (or any other item that can emit an odor detectable by the digital olfactometers 28) (box 62). This can be accomplished in multiple ways, but in one embodiment, whether the item being purchased by the shopper is produce is indicated by the shopper. Particularly, in one embodiment, the shopper places the produce on the scanner scale 22 and then touches a "lookup" control on display 24. In this case, touching the "lookup" control would activate the olfactometer 28. In another embodiment, the shopper verbally identifies the produce (e.g., "This is a banana."). In these embodiments, SCO station 20 would also be configured with a microphone and access to voice recognition software, as is known in the art. In yet other embodiments, whether the item being purchased by the shopper is produce is determined using image analytics (e.g., by digitally analyzing an image of the item being scanned on scanner scale 22 and identifying the item as produce based on that analysis). In these embodiments, the type of produce being purchased can also be identified.

If the item is not a produce item, method 60 ends. Otherwise, computing device 26 of SCO station 20 activates the one or more digital olfactometers 28 (box 64) to electronically sense the one or more chemical compounds that contribute to the odor being emitted by the produce (box 66). Computing device 26 then generates an "odor profile" for the produce being purchased (box 68). According to the present disclosure, the odor profile is generated to comprise information representing the one or more chemical compounds that were detected. Then, based on the information in the odor profile, computing device 26 determines a "freshness date" for the produce (box 70). The determined freshness date, as stated above, indicates a last date that the produce is considered fresh. Additionally, as described in more detail later, computing device 26 can also identify the particular produce (e.g., apple), as well as the particular variety of the produce (e.g., Gala apple, Red Delicious apple, Fiji apple, etc.) based on the information in the odor profile, and output that information to display 24 to be viewed by the shopper.

Computing device 26 then generates a message comprising the determined freshness date (box 72) and sends the message to a device associated with the shopper indicating the freshness date for the produce (box 74). For example, according to one embodiment, the message is output to display 24 so that the shopper views the freshness date. In another embodiment, the message is sent to the shopper's mobile device 52 via base station 50. In still other embodiments, the message is sent to both the display 24 and the shopper's mobile device 52. Regardless, such delivery options can be customized by the shopper via a loyalty program, for example. According to the present disclosure, the shopper could have a personal preferences profile that is known to the store. In this profile, the shopper may provide a phone number, email, or other destination indicator in which he/she wishes to receive information concerning the freshness date of the produce. Once the shopper is identified (e.g., by manual identification or image analytics), computing device 26 accesses the corresponding profile and delivers information concerning the freshness date to the shopper based on the indicated preferences of the shopper. So informed, the shopper can decide whether to purchase the produce or delete the produce from the purchased items list.

Should the shopper decide to purchase the produce, embodiments of the present disclosure are advantageously configured to provide the shopper with subsequent reminder messages regarding the freshness date of the produce (box 76). By way of example, computing device 26 may update the shopper's profile with information about the freshness date for the produce. One or more timers may also be initiated. Responsive to the expiration of those timers, AS 40 could be configured to transmit a reminder message about the freshness of the produce to the shopper's mobile device 52.

For example, consider a shopper who purchases bananas from a grocery store. According to the present disclosure, the shopper may be informed, at the time of purchase, that the bananas will be fresh for another week (e.g., another seven days). Thereafter, once the shopper has returned home and based on the shopper's personal loyalty profile, AS 40 may generate and send a reminder message (e.g., a text message) to the shopper's mobile device 52. The message may, for example, indicate to the shopper that the bananas they purchased will be fresh for another two days. The shopper is then reminded of the bananas and can consume them before they exceed their freshness date.

In some cases, the shopper may wish to let the bananas become overly ripe to use in a banana bread recipe, for example. In these cases, the reminder messages serve to indicate to the shopper that the bananas may be usable for the recipe after another two days has passed.

In any case, method 60 calls for a computing device in system 10 (e.g., computing device 26, 36, or AS 40) to generate such reminder messages based on the information in the shopper's profile and send those reminder messages to the shopper's mobile device 52.

Figure 5:
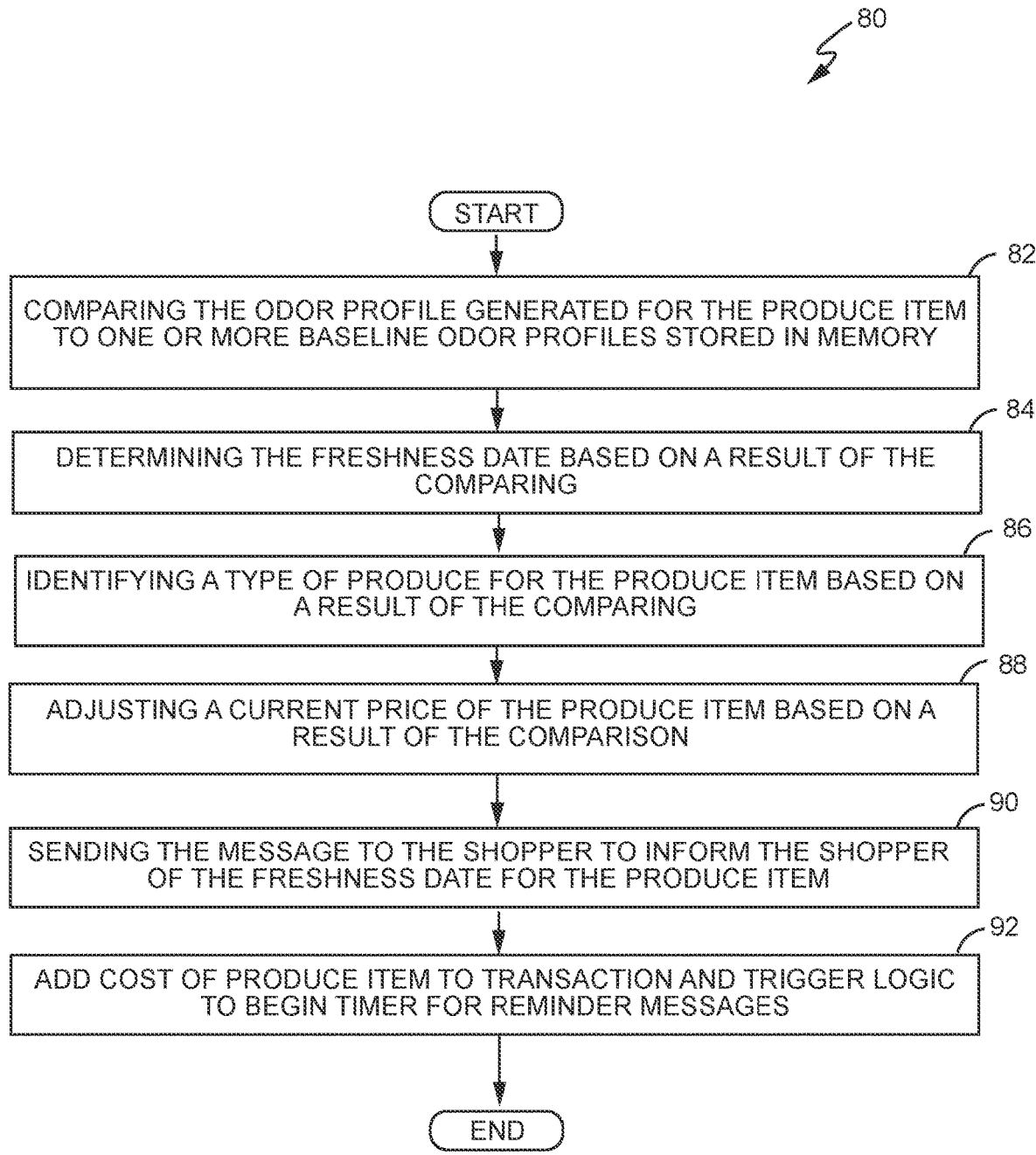
FIG. 5 is a flow diagram illustrating a method for determining a freshness date of a produce item according to one aspect of the present disclosure.

FIG. 5 is a flow diagram illustrating a method 80 for determining the freshness date of a produce item being purchased by a shopper according to one aspect of the present disclosure. As above, method 80 is described as if it were implemented by computing device 26 of SCO station 20. However, this is also for illustrative purposes. According to the present disclosure, method 80 may be implemented by computing device 26, computing device 36, AS 40, and/or any combination thereof. Additionally, it should be noted here that method 80 assumes that the digital olfactometers 28 have been activated and have electronically sensed the one or more chemical compounds that contribute to the odor being emitted by the produce.

As seen in FIG. 5, computing device 26 will compare the odor profile generated for the produce to one or more baseline odor profiles stored in memory (box 82). Such "baseline" odor profiles may, for example, be learned by computing device 26 over time on a per-produce or per-produce type basis and stored in memory (e.g., a database). Further in some embodiments, information associated with the odors sensed for produce when a shopper purchases the produce may be used to update existing baseline odor profiles.

Regardless, computing device 26 is configured, in this embodiment, to determine the freshness date for the produce being purchased based on a result of that comparison (box 84). By way of example only, the generated odor profile and the baseline odor profile may both contain similar information related to the chemical compounds sensed by olfactometers 28. An analysis performed on this information can identify the particular chemical compounds that were sensed (e.g., sulfur compounds), as well as their amounts, and compare the information to that stored in a corresponding baseline odor profile for the type of produce. Additionally or alternatively, the analysis may identify the particular chemical compounds and their amounts as compared to other chemical compounds and their amounts.

As stated previously, the array of chemical compounds that contribute to an odor being emitted by a particular piece of produce is unique. Therefore, the sensed compounds are like a "fingerprint." Based on the data yielded by the analysis comparing the generated "fingerprint" to the baseline "fingerprint," computing device 26 can identify the produce being purchased (e.g., an apple) as well as the particular variety of produce being purchased (e.g., Gala apple, Red Delicious apple, Fiji apple, etc.) (box 86), in addition to providing an accurate estimate of how long that particular piece (or type) of produce will remain fresh.

In one aspect, for example, the present disclosure configures computing device 26 to use olfactometers 28 to detect the amount of "biogenic amines" of the produce. Biogenic amines are what causes the so-called "foul" smell as food begins to spoil. Based on the strength of the detected smell (i.e., the strength of the detected biogenic amines, which may be determined by the comparison), computing device 26 can determine how much longer the produce should remain fresh. For example, computing device 26 could compare the amount of detected biogenic amines being emitted by the produce to one or more threshold values for that produce. Then, based on the results of that comparison, computing device 26 could determine the freshness date as a "best by" or "use by" date.

Additionally, the present embodiments may also configure computing device 26 to adjust the price of a produce item based on the results of the freshness analysis (box 88). For example, produce that is farther away from its "freshness date" may be allowed to ring up at its advertised price. The price of produce that is closer to or beyond its freshness date, however, may be adjusted to apply a predetermined discount for the produce. The price adjustment may, for example, be based on a set of one or more predetermined rules that discount such "older" produce by a predefined percentage or percentage range. Not only does this latter embodiment help reduce costs for shoppers, but it assists retailers in moving their produce rather than throwing it out.

Regardless, computing device 26 generates a message including the determined freshness date, and in some embodiments related information, and sends that message to a display (e.g., display 24 and/or mobile device 52) that is viewable by the shopper (box 90) to inform the shopper of the freshness date for the produce he/she is purchasing. For example, the message would provide information identifying the produce and variety of the produce being purchased and may inform the shopper that he/she should consume the produce being purchased within one day. In another example, the message may inform the shopper that the produce is consumable for another three days or a week. Then, based on this information, the shopper can either confirm the purchase or decide not to purchase the produce.

For example, to confirm the purchase, the shopper may touch a touch-sensitive control on display 24 (e.g., an "OK" button) or simply move the produce from the scanner scale 22 to a bagging area. In response to the shopper confirmation, the produce would be added to the transaction and show up on the scrolling receipt (box 92). In one embodiment, adding the produce to the transaction triggers logic starting a timer for sending the freshness reminder messages to the shopper. To indicate that they do not want to purchase the produce, however, the shopper may touch a different touch-sensitive control on display 24 (e.g., "CANCEL"). In these later cases, the produce would not be added to the transaction.

Figure 6:
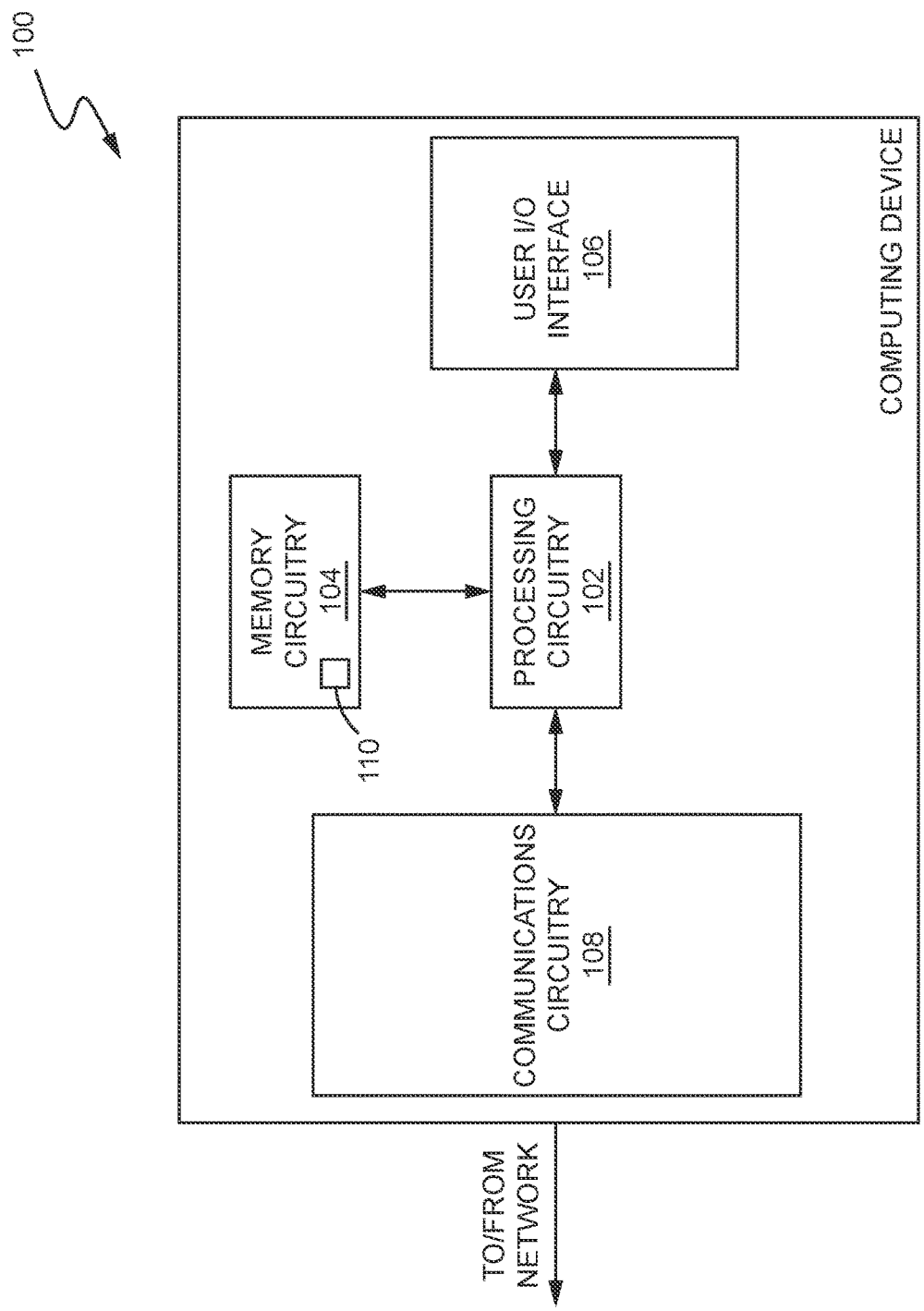
FIG. 6 is a block diagram illustrating some components of a computing device configured according to one aspect of the present disclosure.

FIG. 6 is a block diagram illustrating some components of a computing device 100 configured according to one aspect of the present disclosure. Computing device 100 may be computing device 26 or computing device 36 or AS 40.

As seen in FIG. 6, computing device 100 comprises processing circuitry 102, memory 104, a user input/output (I/O) interface 106, and a communications interface circuit 108.

Processing circuitry 102 comprises one or more microprocessors, hardware circuits, firmware or a combination thereof. In the exemplary embodiments described herein, processing circuitry 102 is configured to receive a message from a checkout station, such as SCO 20 or ACO station 30, for example, comprising data representing the detected chemical compounds (e.g., biogenic amines) emitted by the produce being purchased by a shopper. Upon receipt, processing circuitry 102 generates the odor profile representing the detected chemical compounds and compares that information to that stored in one or more baseline odor profiles. Based on the results of the comparison, processing circuitry 102 can identify the particular type of produce being purchased by the shopper, as well as it's freshness date, and generate a message containing that information. The message is then sent to a display (e.g., display 24 and/or mobile device 52) informing the shopper of the freshness date.

In some aspects, processing circuitry 102 may also be configured to update the baseline aromatic profiles based on the detected chemical compounds emitted by the produce being purchased.

Memory 104 comprises a non-transitory computer readable medium that stores program code and data used by the processing circuitry 102 for operation. In this embodiment, the program code and data comprises a control program 110 that, when executed by processing circuitry 102, configures computing device 100 to perform the functions previously described. Memory 104 may therefore include both volatile and non-volatile memory, and may comprise random access memory (RAM), read-only memory (ROM), and electrically erasable programmable ROM (EEPROM) and/or flash memory. Additionally, or alternatively, memory 104 may comprise discrete memory devices, or be integrated with one or more microprocessors in the processing circuitry 102.

The user I/O interface 106 comprises, in one or more embodiments, one or more input devices and display devices to enable a user, such as a store associate or operator, for example, to interact with and control computing device 100. Such devices may comprise any type of device for inputting data into a computing device including, but not limited to, keyboards, number pads, push buttons, touchpads, touchscreens, or voice activated inputs. The display devices that comprise user I/O interface 106 may comprise, for example, a liquid crystal display (LCD) or light emitting diode (LED) display. In some embodiments, the display device may comprise a touchscreen display that also functions as a user input device.

The communications interface circuitry 108 comprises, in one embodiment, a transceiver circuit and/or interface circuit for communicating with remote devices over a communication network (e.g., network 12) or direct communication link. For example, the communications interface circuit 108 may comprise a WiFi interface, a cellular radio interface, a BLUETOOTH interface, an ETHERNET interface, or other similar interface for communicating over a communication network or communication link. Computing device 100 may use the communications interface circuit 108, for example, to communicate with one or more databases, computers, and olfactometers 28, 38 to obtain data and information regarding an odor being emitted from produce, as previously described.

Figure 7:
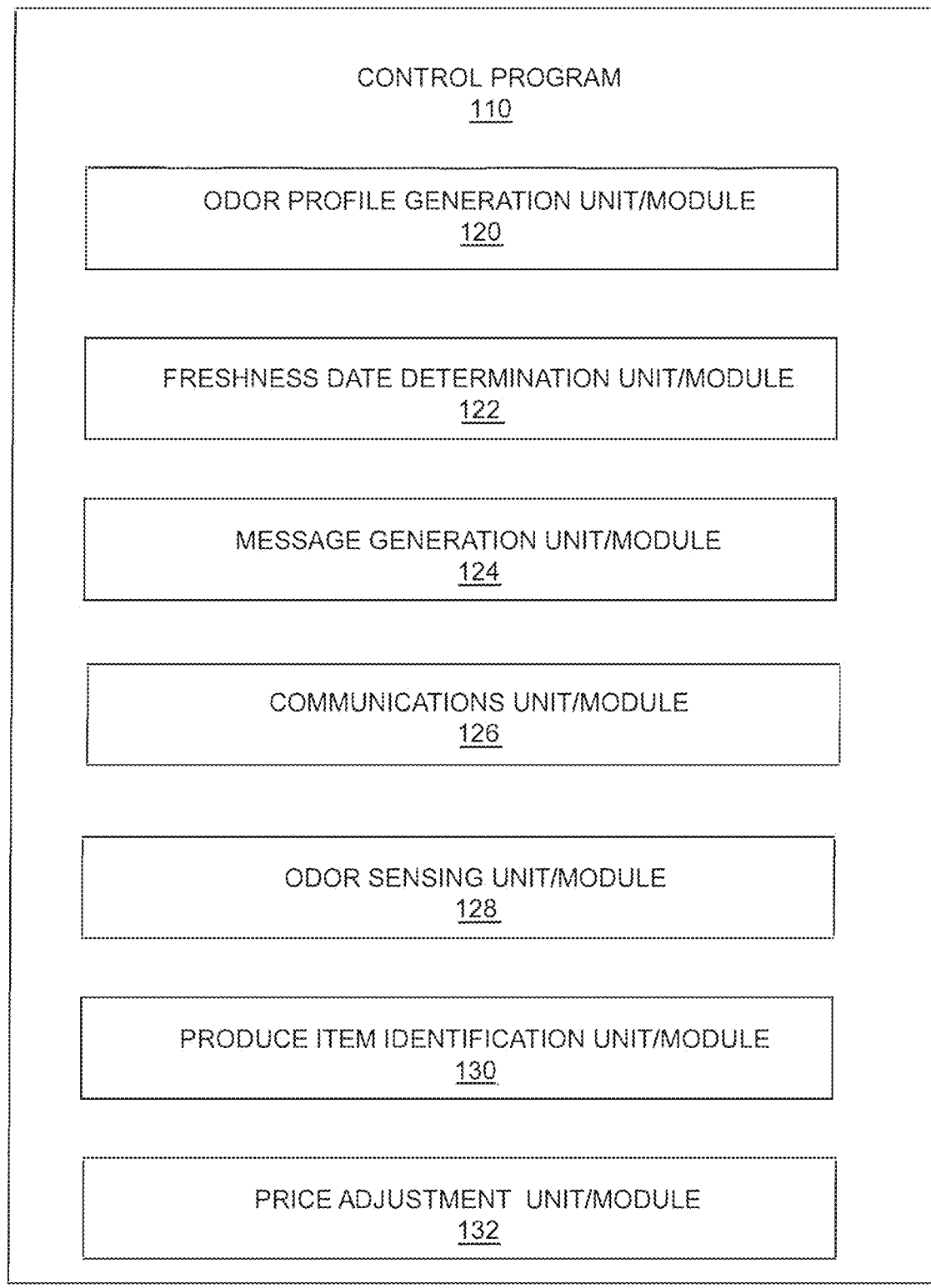
FIG. 7 is a schematic block diagram of a computer program product configured to identify a produce item based on an odor emitted by the produce item according to one embodiment of the present disclosure.

FIG. 7 is a schematic block diagram of a computer program product configured to identify the freshness of produce being purchased based on an odor emitted by the produce according to one embodiment of the present disclosure. As seen in FIG. 7, processing circuitry 102 (seen in FIG. 6) executes control program 110, which is embodied in a non-transitory, computer-readable medium, such as memory 104 (also seen in FIG. 6) of computer device 100, or alternatively, in a removable memory device, such as a thumb drive or disc. Control program 110 in this embodiment comprises an odor profile generation unit/module 120, a freshness date determination unit/module 122, a message generation unit/module 124, a communications unit/module 126, an odor sensing unit/module 128, a produce detection unit/module 130, and a price adjustment unit/module 132.

The odor profile generation unit/module 120 comprises program code that when executed by processing circuitry 102, causes computing device 100 to generate an odor profile for a particular produce, as previously described. The information used to generate the odor profile may be provided by the odor sensing unit/module 128, as previously described.

The freshness date determination unit/module 122 comprises program code that when executed by processing circuitry 102, causes computing device 100 to compare the generated odor profile to one or more baseline odor profiles stored in memory, as previously described. Based on the results of this comparison, the freshness date determination unit/module 122 determines a "freshness date" for the produce (i.e., the last date that the produce item is considered to be fresh), as previously described.

The message generation unit/module 124 comprises program code that when executed by processing circuitry 102, causes computing device 100 to generate a message comprising the determined freshness date to send to a shopper, as previously described.

The communications unit/module 126 comprises program code that when executed by processing circuitry 102, causes computing device 100 to send and receive data and information to and from other devices. For example, in one embodiment, communications unit/module 126 causes computing device 100 to receive information associated with the detected chemical compounds that contribute to an odor being emitted by the produce, as previously described. In another embodiment, communications unit/module 126 causes computing device 100 to send information associated with the detected chemical compounds to a shopper, as previously described. Such sent information includes, but is not limited to, the freshness date determined for the produce, as previously described. In some aspects, communications unit/module 126 causes computing device 100 to send reminder messages to the shopper, as previously described.

The odor sensing unit/module 128 comprises program code that when executed by processing circuitry 102, causes computing device 100 to activate olfactometers 28, 38 to detect the chemical compounds that contribute to the odor being emitted from produce, as previously described.

The produce item identification unit/module 130 comprises program code that when executed by processing circuitry 102, causes computing device 100 to identify the produce being purchased based on the detected chemical compounds, as previously described.

The price adjustment unit/module 132 comprises program code that when executed by processing circuitry 102, causes computing device 100 to adjust the price of the produce being purchased based on its determined freshness date, as previously described.

The present embodiments may, of course, be carried out in ways other than those specifically set forth herein without departing from essential characteristics of the disclosure. For example, the previous embodiments illustrate the operation of the present disclosure in the context of an SCO station 20 or an ACO station 30. However, those of ordinary skill in the art should realize that the present disclosure is not so limited.

Figure 8:
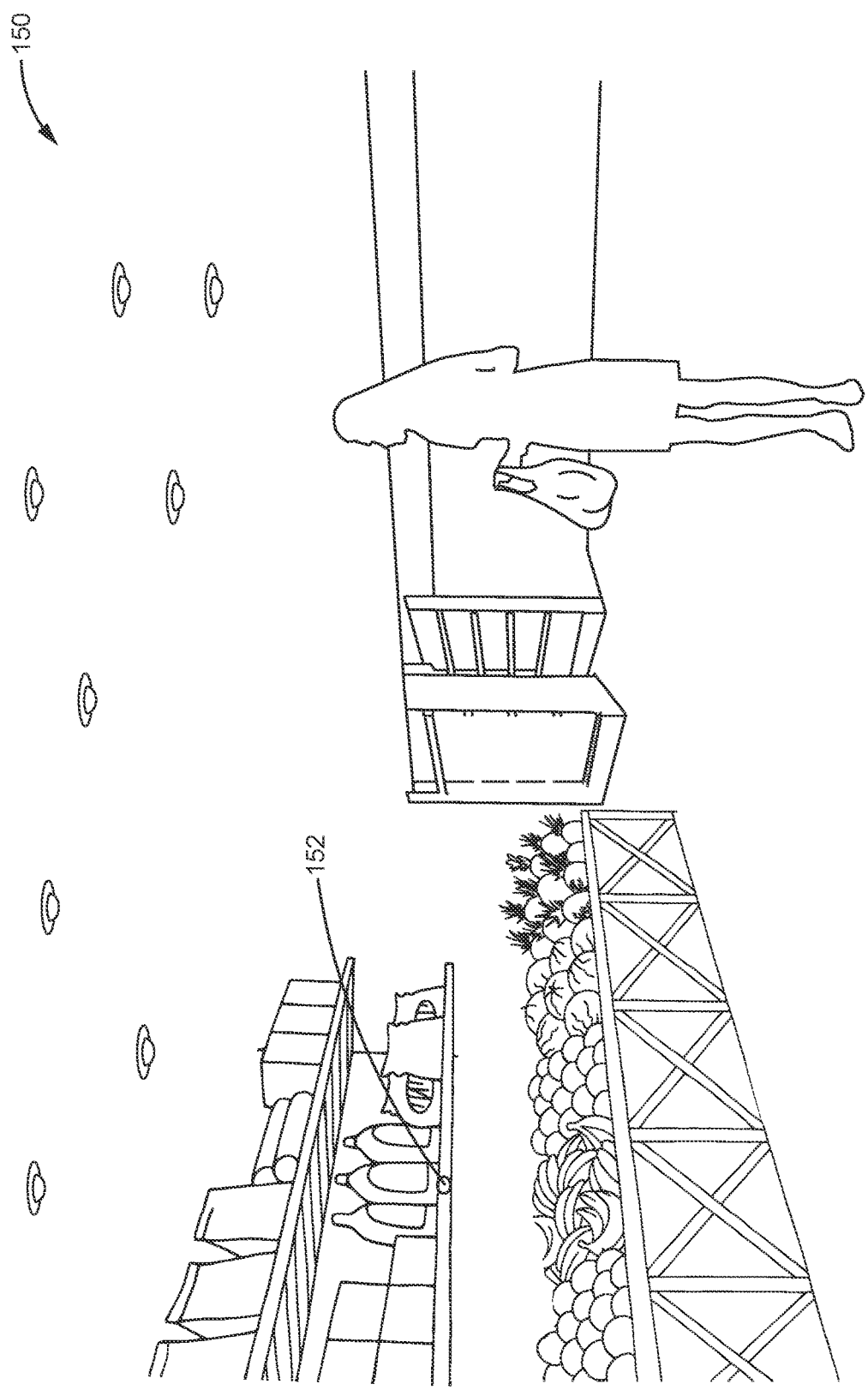
FIG. 8 is a perspective view of the interior of a contactless store configured according to one aspect of the present disclosure.

FIG. 8, for example, illustrates an embodiment in which the present disclosure is implemented in the context of a so-called "contactless store" 150. As is known in the art, contactless stores allow shoppers to purchase products with little to no touching by a store employee. Shoppers can, for example, select an item from the store. Once selected, an image analysis or other process automatically adds the selected item to a list and debits the shopper's account for the purchase.

In the context of the present disclosure, however, contactless stores are also configured to include one or more olfactometers 152 disposed in and/or around the shelving or containers that include produce. In operation, the olfactometers 152 detect the chemical compounds emitted by produce selected by the shopper and determine the freshness date for the produce, as previously described. Additionally, the shopper may be informed of the freshness date, and other information, by system 10 via mobile device 52. In these embodiments, and with the exception of the odor sensing functions, AS 40 may be configured to implement the previously described embodiments.

Additionally, the previous embodiments describe the functions of the disclosure as if they are performed at a single computing device (e.g., computing device 26, 36, or AS 40). However, this is merely for ease of discussion. In some embodiments, implementation of the functions described herein are distributed across multiple computing devices. That is, computing device 26 or 36 may implement the odor sensing functionality, but provide the information related to the sensed chemical compounds to AS 40. In response, AS 40 could be configured to implement the produce identification and freshness date determination functions, as previously described, and send the generated messages to display 24, 34, and/or mobile device 52, as previously described.

Therefore, the present embodiments are to be considered in all respects as illustrative and not restrictive, and all changes coming within the meaning and equivalency range of the appended claims are intended to be embraced therein.

What is claimed is:

1. A method for checking out produce from a store, the method comprising:

generating an odor profile for a produce item being purchased by a shopper, wherein the odor profile comprises information representing one or more electronically-sensed chemical compounds that contribute to an odor being emitted by the produce item, and wherein generating the odor profile comprises:

selectively activating one of a first sensor and a second sensor to electronically sense the one or more chemical compounds based on a position of the produce item above an underlying ground surface, wherein the first sensor is activated when the produce item is at a first position above the underlying ground surface and wherein the second sensor is activated when the produce item is at a second position above the underlying ground surface, and wherein the second position is closer to the underlying ground surface than the first position; and electronically sensing the one or more chemical compounds that contribute to the odor being emitted by the produce item using the selectively activated first or second sensor;

determining a freshness date for the produce item based on the odor profile;

generating a message comprising the freshness date; and sending the message to a device associated with the shopper indicating the freshness date for the produce item.

2. The method of claim 1, wherein the freshness date indicates a last date that the produce item is considered fresh.

3. The method of claim 1, further comprising:
identifying an item being purchased by the shopper as produce; and
selectively activating the first or second sensor to electronically sense the one or more chemical compounds responsive to identifying the item being purchased by the shopper as produce.

4. The method of claim 1, wherein determining a freshness date for the produce item based on the odor profile comprises:
comparing the odor profile generated for the produce item to one or more baseline odor profiles stored in memory; and
determining the freshness date based on a result of the comparing.

5. The method of claim 4, further comprising identifying a type of produce for the produce item based on a result of the comparing.

6. The method of claim 1, wherein the freshness date is determined based on a comparison between an amount of the one or more chemical compounds represented in the odor profile and one or more predetermined threshold values associated with the produce item.

7. The method of claim 6, further comprising adjusting a current price of the produce item based on a result of the comparison.

8. The method of claim 7, wherein the one or more chemical compounds include biogenic amines.

9. The method of claim 1, wherein sending the message to the device indicating the freshness date for the produce item comprises outputting the message to a display viewable by the shopper.

10. The method of claim 1, further comprising sending a reminder message to a computing device of the shopper reminding the shopper of the freshness date for the produce item.

11. The method of claim 1, wherein, responsive to the shopper purchasing the produce item, the method further comprises:
initiating a timer associated with the purchase of the produce item; and
automatically sending a reminder message to a device of the shopper responsive to expiration of the timer, wherein the reminder message includes the freshness date and instructions for:
preparing and/or consuming the produce item on or before the freshness date; and/or
instructions for storing the produce item on or before the freshness date.

12. A computing device configured for a checkout system in a store, the computing device comprising:
communications interface circuitry configured to communicate data with one or more remotely located devices via a communication network;
first and second sensors disposed on the computing device at different positions relative to an underlying ground surface, wherein each of the first and second sensors is configured to electronically sense one or more chemical compounds that contribute to an odor being emitted by a produce item; and
processing circuitry operatively connected to the communications interface circuitry and configured to:
generate an odor profile for the produce item being purchased by a shopper, wherein the odor profile comprises information representing the one or more electronically-sensed chemical compounds that contribute to the odor being emitted by the produce item, and wherein to generate the odor profile, the processing circuitry is configured to:
selectively activate one of the first and second sensors to electronically sense the one or more chemical compounds based on a position of the produce item above the underlying ground surface, wherein the first sensor is activated when the produce item is at a first position above the underlying ground surface and wherein the second sensor is activated when the produce item is at a second position above the underlying ground surface, and wherein the second position is closer to the underlying ground surface than the first position; and
electronically sense the one or more chemical compounds that contribute to the odor being emitted by the produce item using the selectively activated one of the first and second sensors;
determine a freshness date for the produce item based on the odor profile;
generate a message comprising the freshness date; and
send the message to a device associated with the shopper indicating the freshness date for the produce item.

13. The computing device of claim 12, wherein the processing circuitry is further configured to:
identify an item being purchased by the shopper as produce; and
selectively activate the first or second sensor to electronically sense the one or more chemical compounds responsive to identifying the item being purchased by the shopper as produce.

14. The computing device of claim 12, wherein the processing circuitry is configured to:
determine a freshness date for the produce item based on a comparison of the odor profile to one or more baseline odor profiles stored in memory; and
identify a type of produce for the produce item based on a result of the comparison.

15. The computing device of claim 12, wherein the processing circuitry is configured to:
determine the freshness date based on a comparison between an amount of the one or more chemical compounds and one or more predetermined threshold values associated with the produce item; and
adjust a current price of the produce item based on the freshness date.

16. The computing device of claim 12, wherein the processing circuitry is further configured to send a reminder message to a mobile device of the shopper reminding the shopper of the freshness date for the produce item.

17. The computing device of claim 12, further comprising a computer disposed at a checkout station of a store.

18. The computing device of claim 12, further comprising an application server communicatively connected to a checkout station via the communications network.

19. A non-transitory computer readable medium having instructions stored thereon that, when executed by processing circuitry of a computing device associated with a store, configures the computing device to:
generate an odor profile for a produce item being purchased by a shopper, wherein the odor profile comprises information representing one or more electronically-sensed chemical compounds that contribute to an odor being emitted by the produce item, and wherein to generate the odor profile, the processing circuitry configures the computing device to:
  selectively activate one of a first sensor and a second sensor to electronically sense the one or more chemical compounds based on a position of the produce item above an underlying ground surface, wherein the first sensor is activated when the produce item is at a first position above the underlying ground surface and wherein the second sensor is activated when the produce item is at a second position above the underlying ground surface, and wherein the second position is closer to the underlying ground surface than the first position; and
  electronically sense the one or more chemical compounds that contribute to the odor being emitted by the produce item using the selectively activated one of the first and second sensors;
determine a freshness date for the produce item based on the odor profile;
generate a message comprising the freshness date; and
send the message to a device associated with the shopper indicating the freshness date for the produce item.

* * * * *